US011558424B2

(12) United States Patent
Anderson et al.

(10) Patent No.: US 11,558,424 B2
(45) Date of Patent: Jan. 17, 2023

(54) AUTOMATICALLY GENERATING A FINGERPRINT PREVALENCE DATABASE WITHOUT GROUND TRUTH

(71) Applicant: Cisco Technology, Inc., San Jose, CA (US)

(72) Inventors: Blake Harrell Anderson, Chapel Hill, NC (US); David Arthur McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 74 days.

(21) Appl. No.: 17/307,677

(22) Filed: May 4, 2021

(65) Prior Publication Data
US 2022/0360606 A1    Nov. 10, 2022

(51) Int. Cl.
*H04L 29/06* (2006.01)
*H04L 9/40* (2022.01)
*G06K 9/62* (2022.01)

(52) U.S. Cl.
CPC .......... *H04L 63/166* (2013.01); *G06K 9/6215* (2013.01); *G06K 9/6218* (2013.01); *H04L 63/306* (2013.01)

(58) Field of Classification Search
CPC .......................... H04L 63/166; H04L 63/306
See application file for complete search history.

(56) References Cited

U.S. PATENT DOCUMENTS

2018/0103056 A1* 4/2018 Kohout ............... H04L 63/1416
2018/0234388 A1* 8/2018 Reddy .................. H04L 63/306
2019/0268421 A1* 8/2019 Markuze ................. H04L 67/10
2019/0319977 A1* 10/2019 Gottschlich .......... G06K 9/6256
2020/0004958 A1    1/2020 McGrew et al.
2020/0120072 A1    4/2020 Althouse et al.
2021/0288981 A1* 9/2021 Numainville ....... H04L 63/1441

FOREIGN PATENT DOCUMENTS

WO    WO2020176945 A1    9/2020

OTHER PUBLICATIONS

Fadlullah et al., "DTRAB: Combating Against Attacks on Encrypted Protocols Through Traffic-Feature Analysis", IEEE/ACM Transactions on Networking, vol. 18, Issue: 4, August (Year: 2010).*
Anderson, Blake, et al., "TLS Beyond the Browser: Combining End Host and Network Data to Understand Application Behavior," article downloaded from https://dl.acm.org/, published Oct. 21-23, 2019, 14 pages.

* cited by examiner

*Primary Examiner* — Morshed Mehedi
(74) *Attorney, Agent, or Firm* — Lee & Hayes, P.C.

(57) ABSTRACT

Techniques and mechanisms for using passively collected network data to automatically generate a fingerprint prevalence database without the need for endpoint ground truth. The process first clusters all observations with the same fingerprint string and similar source and destination context. The process then annotates each cluster with descriptive information and uses a rule-based system to derive an informative name from that descriptive information, e.g., "winnt amp client" or "cross-platform browser". Optionally, the learned database may be augmented by a user to clarify custom process labels. Additionally, the generated database may be used to report the inferred processes in the same way as databases generated with endpoint ground truth.

20 Claims, 8 Drawing Sheets

AUTOMATICALLY GENERATING A FINGERPRINT PREVALENCE DATABASE WITHOUT GROUND TRUTH

TECHNICAL FIELD

The present disclosure relates generally to computer networks, and, more particularly, to using Transport Layer Security (TLS) fingerprinting for process identification.

BACKGROUND

Network traffic is becoming increasingly encrypted. Indeed, some studies estimate that more than 70% of all network traffic is now encrypted, with this figure expected to continue to grow.

Identifying the process associated with an encrypted traffic session can be quite useful. In the security domain, for example, process identification can be used to detect malware or vulnerable executables on an endpoint. Likewise, in the networking domain, routers and switches may use this information to prioritize traffic or aid in diagnostics, such as analyzing how processes communicate across different network segments.

In some protocols, such as Secure Socket Layer (SSL) and HyperText Transfer Protocol (HTTP), a clear-text/unencrypted description of the process is sent with the traffic, affording at least some degree of ground truth as to the sending process. However, the Transport Layer Security (TLS) protocol lacks this clear-text description of the source process. TLS fingerprinting offers one potential way to make inferences from the cryptographic parameters. TLS fingerprinting identifies the client process that initiated a TLS connection by analyzing data features observed in the initial TLS handshake. As many distinct processes can create the same characteristic TLS fingerprint string, an effective fingerprint system must incorporate destination context (destination IP address, port, and TLS server name) to disambiguate the set of potential processes. The fingerprint system requires a detailed fingerprint prevalence database that includes not just fingerprints and processes, but also the destinations those processes visited, and the prevalence with which those processes visited the destinations. Creating this database requires extensive traffic observations and ground truth about the processes that created them. The process information is expensive or infeasible to collect in some networks. However, some endpoints of networks are historically difficult to collect endpoint ground truth from (e.g., IoT, mobile networks/devices, containers, servers, etc.).

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
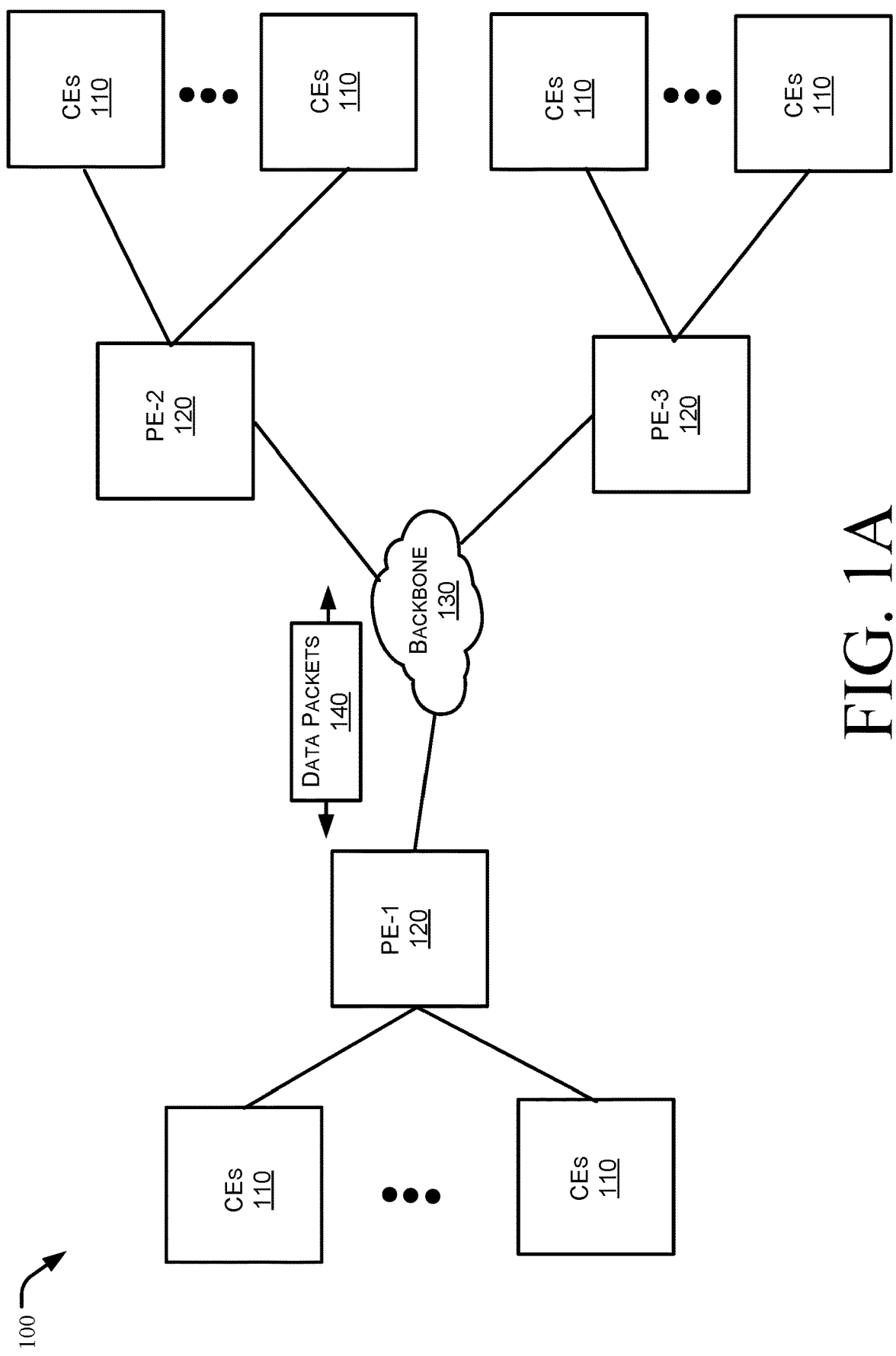
FIGS. 1A-1B illustrate an example communication network that carries encrypted traffic.

This disclosure describes techniques for using passively collected network data to automatically generate a fingerprint prevalence database without the need for endpoint ground truth. The process first clusters all observations with the same fingerprint string and similar source and destination context. The process then annotates each cluster with descriptive information and uses a rule-based system to derive an informative name from that descriptive information, e.g., "winnt amp client" or "cross-platform browser". Optionally, the learned database may be augmented by a user to clarify custom process labels. Additionally, the generated database may be used to report the inferred processes in the same way as databases generated with endpoint ground truth.

In particular, passive network observations comprising a network fingerprint string, the network 5-tuple, timestamp, and additional context (such as, for example, the TLS server_name) related to traffic in a network may be collected as data. In configurations, the 5-tuple may comprise a source Internet Protocol (IP) address, a destination IP address, a source port number, a destination port number, or an IP protocol number.

In configurations, the passive network observations may be grouped by their fingerprint strings. All network observations originating from the same client process or process family may be clustered together using a distance-based clustering algorithm (e.g., density-based spatial clustering of applications with noise (DBSCAN)), where the distance takes into account the destination IP address/destination port/server_name (are the observations going to the same place) and the source IP address/source port/timestamp (are the observations being generated from the same machine/user/process). The result is a fingerprint database entry that can be used in fingerprinting with destination context. Each fingerprint string has a list of processes, where each process is one of the found clusters. The fingerprint database entries may be entered in a database.

A name may be assigned to each cluster using a summary of the psuedo-process's connections and a rule-based engine. The processes may be annotated with context information gleaned from the network observations. This may include the source IP addresses, client operating systems, client/server certificates, common domain names, or diversity metrics. The rule-based engine may take this context information and generate a short, informative description of the process. The rule-based engine may encode known behaviors (e.g., browsers have more diversity in their destinations while cloud orchestration software predominately talks to subnets located in cloud-based networks) and/or dominate domain names or certificates often indicate the client process (e.g., a website for malware protection is by far the most popular destination for Advanced Malware Protection (AMP) for endpoints). The rule-based engine may use rules generated from ground-truth databases and experts. As examples, if the process was seen from many users/OSes and goes to many unique destinations, the rules-based engine may label the process related to the cluster as "cross-platform browser" in the database. If the process only talks to a specific destination, e.g., malware.protection.com, from OS hosts, label the process related to the cluster as "winnt malware protection client" in the database.

In configurations, if ground truth is available, the database entries may be modified by a user to rename the auto-generated process names with their ground truth names. The general context provided in the database simplifies this step. Independent of whether the user provides ground truth, the result of this process described herein is a fingerprint database that may provide valuable network intelligence in the same way databases generated from endpoint ground truth can.

Accordingly, the process described herein uses passively collected network data to generate a fingerprint database. This is accomplished by using additional features of the network data (like the source IP address and timestamp) to cluster observations using the same fingerprint into distinct "processes." These "processes" are then given informative names by leveraging expert-generated and machine-generated rules. A user may augment the rule-generated process names with their own process names, but it is not necessary for the process to provide value. Previous fingerprint databases required ground truth from an endpoint and passively collected network data to generate a fingerprint database.

Observing network traffic is important to network security. TLS fingerprinting, and network protocol fingerprinting in general, provides an efficient means to understanding an endpoint's processes, libraries, operating systems, and configurations directly from the network traffic. Previous fingerprinting approaches required detailed ground truth from the endpoints to be useful. The process described herein allows fingerprinting techniques to easily generalize to classes of traffic (container/IoT/server/mobile) where it has historically been difficult to collect ground truth. Thus, a major advantage of the process described herein is that the process may easily generalize to endpoints that are historically difficult to collect endpoint ground truth from (e.g., IoT devices, mobile networks/devices, containers, servers, etc.).

Accordingly, as an example of identifying a process that initiated an encrypted traffic session using passively collected network data to automatically generate a fingerprint prevalence database without the need for endpoint ground truth, an electronic device collects first data with respect to first traffic in a computer network. The first data is related to network connections (e.g., transport layer security (TLS) and comprises (i) fingerprint strings (e.g., TLS fingerprint strings) and (ii) one or more of source information or destination information related to the fingerprint strings. The electronic device organizes the first data for each unique fingerprint string into clusters based at least in part on the one or more of source information or destination information. Each cluster represents a process of a plurality of processes related to the first traffic. The electronic device obtains context information related to the first data. The context information pertains to contexts of the plurality of processes. The electronic device annotates each cluster with an identification based at least in part on the context information. Each identification relates to identifications of the processes of the plurality of processes. The electronic device enters the clusters into a database as corresponding entries in the database. The electronic device receives second data with respect to second traffic in the computer network. The electronic device compares the second data with one or more entries in the database. The electronic device identifies a process of the plurality of processes as having initiated the second traffic. Sources of the first and/or second data may include, for example, one or more of Internet of Things (IoT) devices, mobile devices, containers, or servers.

Additionally, the techniques described herein may be performed by a system and/or apparatus having non-transitory computer-readable media storing computer-executable instructions that, when executed by one or more processors, performs the method described above.

Example Embodiments

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors)

result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using a CE router with two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
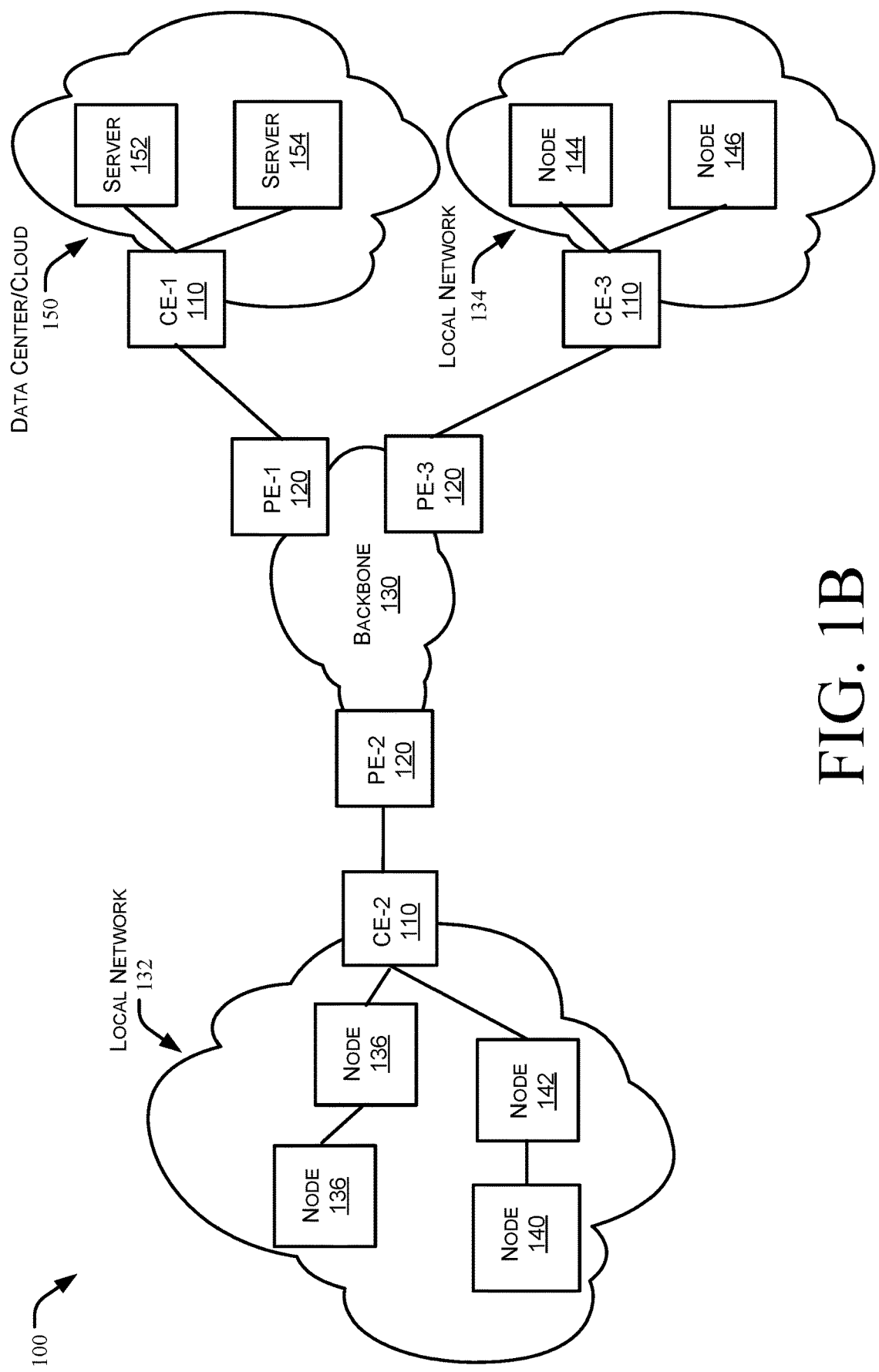

FIG. 1B illustrates an example of network 100 in greater detail, according to various embodiments. As shown, network backbone 130 may provide connectivity between devices located in different geographical areas and/or different types of local networks. For example, network 100 may comprise local networks 132, 134 that include devices/nodes 136, 138, 140, and 142, and devices/nodes 144 and 146, respectively, as well as a data center/cloud environment 150 that includes servers 152 and 154. Notably, local networks 132 and 134 and data center/cloud environment 150 may be located in different geographic locations. Network 100 may include more local networks in various configurations. Additionally, each local network may include more or fewer devices/nodes in various configurations.

Servers 152 and 154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 132 may be an LLN in which CE-2 operates as a root node for nodes/devices 136, 138, 140, and 142 in the local mesh, in some embodiments.

Figure 2:
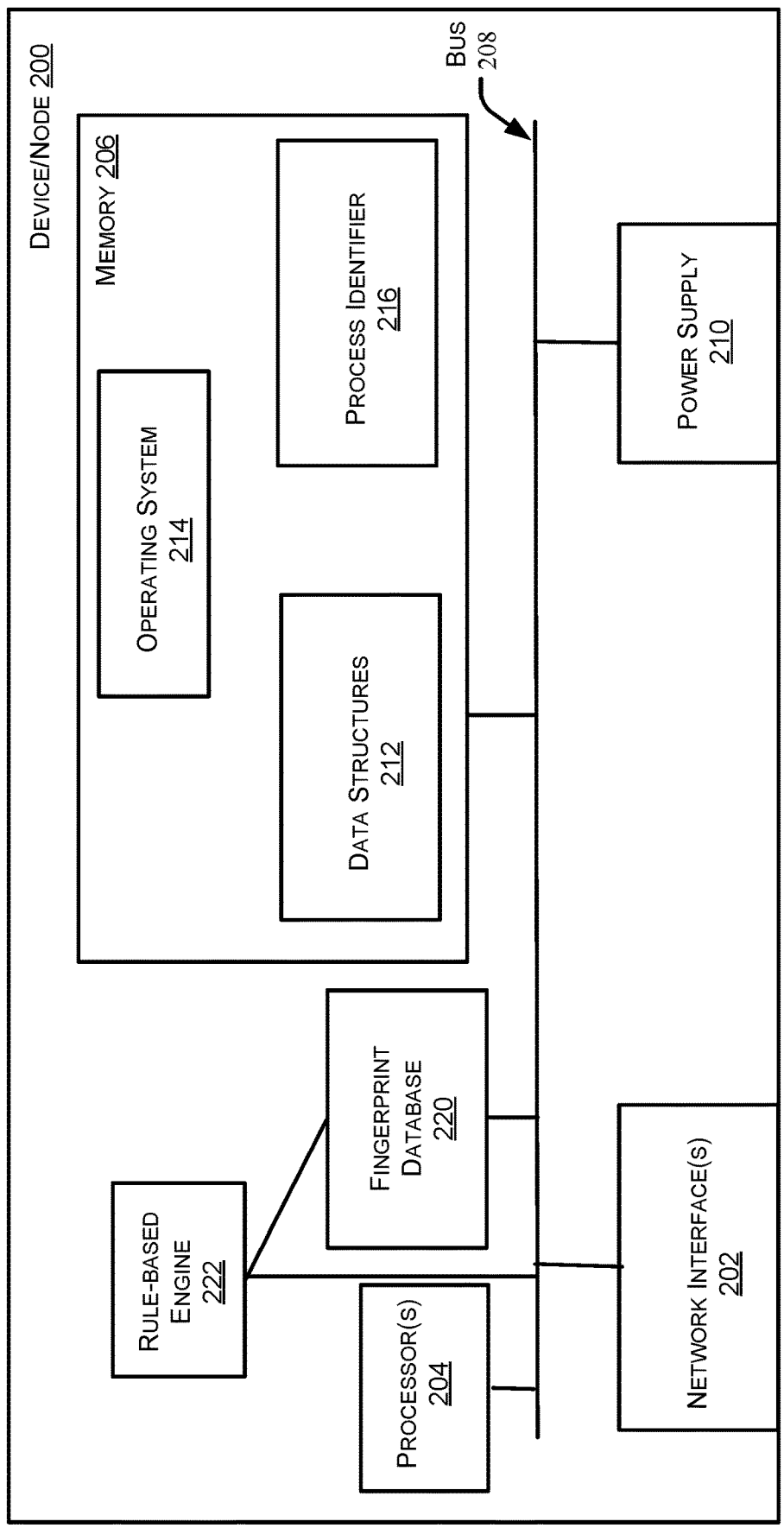
FIG. 2 illustrates an example network device/node of the example communication network of FIGS. 1A and 1B.

FIG. 2 is a schematic block diagram of an example node/device 200 that may be used with one or more embodiments described herein, e.g., as any of the computing devices shown in FIGS. 1A and 1B, particularly the PE routers 120, CE routers 110, nodes/device 136-146, servers 152 and 154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 202, one or more processors 204, and a memory 206 interconnected by a system bus 208 and is powered by a power supply 210.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 202 may also be used to implement one or more virtual network interfaces, such as for virtual private network (VPN) access, known to those skilled in the art.

The memory 206 comprises a plurality of storage locations that are addressable by the processor(s) 204 and the network interfaces 202 for storing software programs and data structures associated with the embodiments described herein. The processor(s) 204 may comprise necessary elements or logic adapted to execute the software programs and manipulate the data structures 212. An operating system 214, portions of which are typically resident in memory 206 and executed by the processor(s), functionally organizes the node by, inter alia, invoking network operations in support of software processors and/or services executing on the device. These software processors and/or services may comprise a process identifier 216.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In configurations, passive network observations comprising a network fingerprint string, the network 5-tuple, timestamp, and additional context (such as, for example, the TLS server_name) related to traffic in the network 100 may be collected as data by the device 200 (and/or other devices 100 in the network 100). In configurations, the 5-tuple may comprise a source Internet Protocol (IP) address, a destination IP address, a source port number, a destination port number, or an IP protocol number.

In configurations, the device 200 may group the passive network observations by their fingerprint strings. The device 200 may then cluster together all network observations originating from the same client process or process family, using a distance-based clustering algorithm (e.g., density-based spatial clustering of applications with noise (DB-SCAN)), where the distance takes into account the destination IP address/destination port/server_name (are the observations going to the same place) and the source IP address/source port/timestamp (are the observations being generated from the same machine/user/process). The result is a fingerprint database entry that can be used in fingerprinting with destination context. Each fingerprint string has a list of processes, where each process is one of the found clusters. The fingerprint database entries may be entered in a database 220, which may be part of the device 200 or may be a separate device in the network 100.

The device 200 may assign a meaningful name to each cluster using a summary of the psuedo-process's connections and a rule-based engine 222. The rule-based engine 222 may be part of the device 200 or may be part of a different device in the network 100. The processes may be annotated with context information gleaned from the network observations. This may include the source IP addresses, client operating systems, client/server certificates, common domain names, or diversity metrics. The rule-based engine 222 may take this context information and generates a short, informative description of the process. The rule-based engine 222 may encode known behaviors (e.g., browsers have more diversity in their destinations while cloud orchestration software predominately talks to subnets located in cloud-based networks) and/or dominate domain names or certificates often indicate the client process (e.g., a website for malware protection is by far the most popular destination for Advanced Malware Protection (AMP) for endpoints). The rule-based engine 222 may use rules generated from ground-truth databases and experts. As an example, if the process was seen from many users/OSes and goes to many unique destinations, the rules-based engine 222 may label the process related to the cluster as "cross-platform browser" in the database 220. As another example, if the process only talks to a specific destination, e.g., malware.protection.com, from OS hosts, label the process related to the cluster as "winnt malware protection client" in the database 220.

In configurations, if ground truth is available, the database 220 entries may be modified by a user to rename the auto-generated process names with their ground truth names. The general context provided in the database 220 simplifies this step. Independent of whether the user provides ground truth, the result of the process described herein is a fingerprint database 220 that may provide valuable network intelligence in the same way databases generated from endpoint ground truth can.

Accordingly, the process described herein uses passively collected network data to generate a fingerprint database. This is accomplished by using additional features of the network data (like the source IP address and timestamp) to cluster observations using the same fingerprint into distinct "processes." These "processes" are then given informative names by leveraging expert-generated and machine-generated rules. A user may augment the rule-generated process names with their own process names, but it is not necessary for the process to provide value. Previous fingerprint databases required ground truth from an endpoint and passively collected network data to generate a fingerprint database.

Observing network traffic is important to network security. TLS fingerprinting, and network protocol fingerprinting in general, provides an efficient means to understanding an endpoint's processes, libraries, operating systems, and configurations directly from the network traffic. Previous fingerprinting approaches required detailed ground truth from the endpoints to be useful. The process described herein allows fingerprinting techniques to easily generalize to classes of traffic (container/IoT/server/mobile) where it has historically been difficult to collect ground truth. Thus, a major advantage of the process described herein is that the process may easily generalize to endpoints that are historically difficult to collect endpoint ground truth from (e.g., IoT, mobile networks/devices, containers, servers, etc.).

Process identifier 216 may thus execute one or more machine learning-based algorithms to identify a potential source process associated with encrypted traffic in the network 100 for any number of purposes. For example, process identifier 216 may assess captured data and/or contextual information regarding one or more traffic flows in the network 100 with respect to entries in the database 220 to identify a potential source process associated with encrypted traffic in the network 100.

Process identifier 216 may employ any number of machine learning techniques, to identify the process associated with encrypted traffic based on the observed data and/or contextual information of the traffic flow and the database 220 entries. In general, machine learning is concerned with the design and the development of techniques that receive empirical data as input (e.g., data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, process identifier 216 can use the model M to classify new data points, such as information regarding new traffic flows and/or processes in the network. Often, M is a statistical model, and the cost function is inversely proportional to the likelihood of M, given the input data.

In various embodiments, process identifier 216 may employ one or more supervised, unsupervised, or semi-supervised machine learning models. Generally, supervised learning entails the use of a training set of data, as noted above, that is used to train the model to apply labels to the input data. For example, the training data may include sample data that has been labeled with an associated process, if known. On the other end of the spectrum are unsupervised techniques that do not require a training set of labels. Notably, while a supervised learning model may look for previously seen patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that process identifier 216 may employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

In some configurations, process identifier 216 may assess the captured data on a per-flow basis. In other embodiments, process identifier 216 may assess captured data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
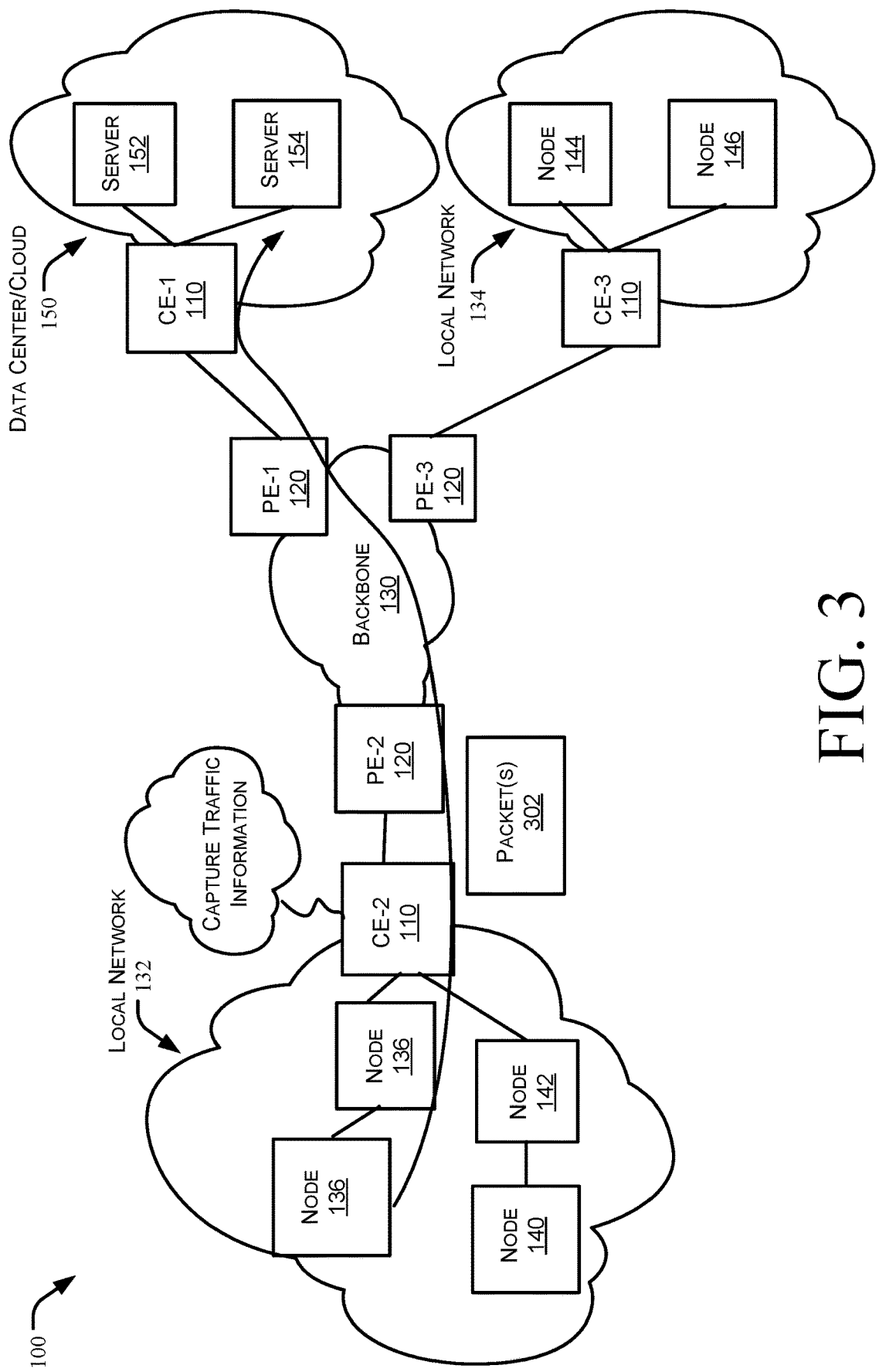
FIG. 3 illustrates an example of a device capturing traffic information of the example communication network of FIGS. 1A and 1B.

As shown in FIG. 3, various mechanisms can be leveraged to capture information about traffic in a network, such as data regarding an encrypted traffic flow. For example, consider the case in which client node 136 initiates a traffic flow with remote server 154 that includes any number of packets 302. Any number of networking devices along the path of the flow may analyze and assess packet 302, to capture data regarding the traffic flow. For example, as shown, router CE-2 through which the traffic between node 136 and server 154 flows may capture data regarding the encrypted traffic flow.

In some embodiments, a networking device may analyze packet headers, to capture feature information about the traffic flow. For example, router CE-2 may capture the source IP address and/or IP port of host node 136, the destination IP address and/or IP port of server 154, the IP protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 136, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device, e.g., network device 200, that captures the network flow data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

Figure 4:
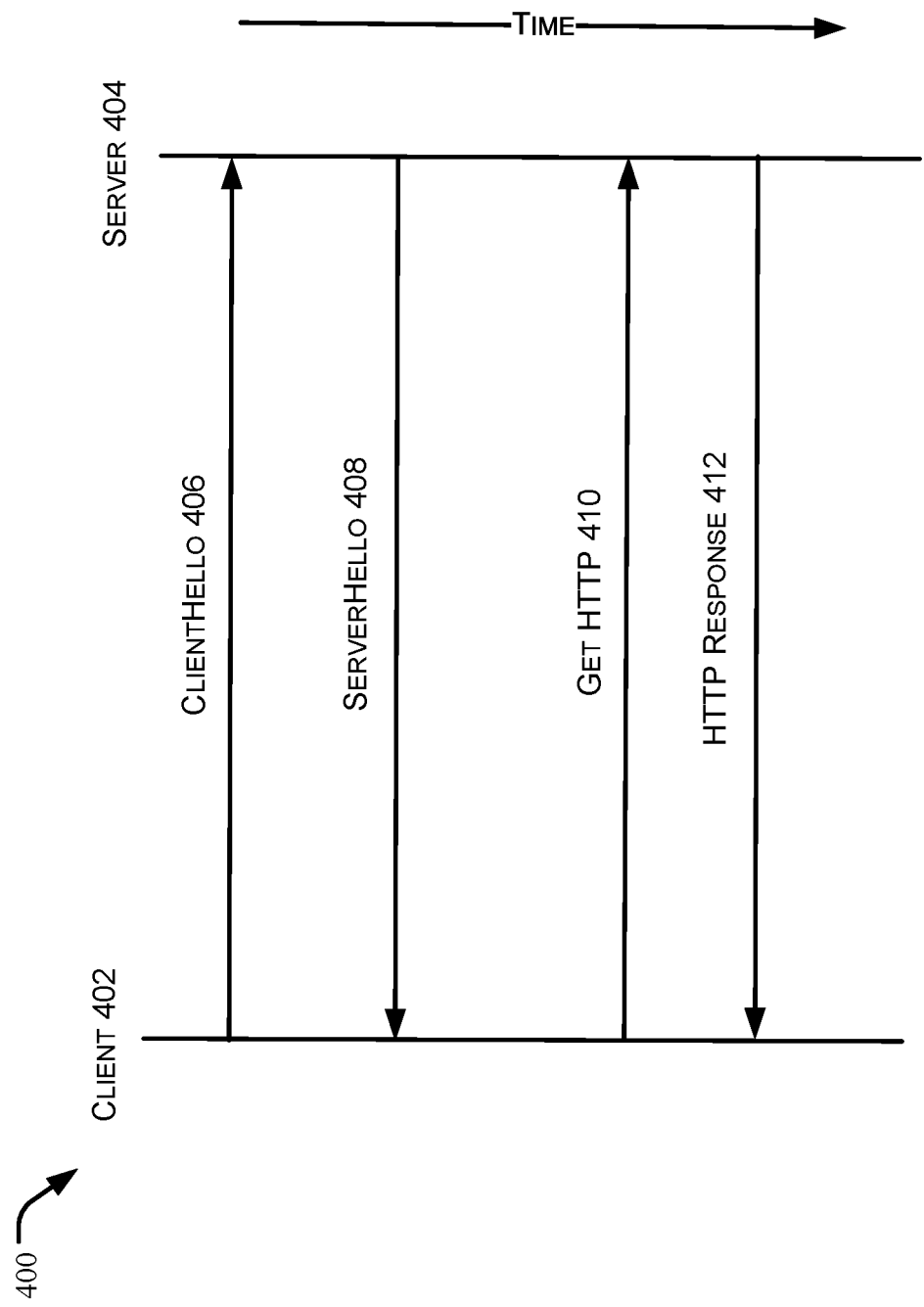
FIG. 4 illustrates an example encrypted traffic session from the example communication network of FIGS. 1A and 1B.

FIG. 4 illustrates an example encrypted session 400 between a client 402 and a server 404. As shown, client 402 may begin by initiating a handshake with server 404 in which cryptographic information is first exchanged. This cryptographic information can then be used by client 402 and server 404, to encrypt subsequent messages between the two. In particular, client 402 may send a ClientHello message 406 to server 404, thereby signifying that client 402 wishes to establish an encrypted session with server 404. Note that, in some cases, client 402 and server 404 may first perform a SYN-ACK, to establish the TCP/IP connection via which ClientHello message 406 may be sent.

In various cases, ClientHello message 406 may include cryptographic keys for client 402 that can be used by server 404 to immediately begin encrypting the messages sent by server 404 back to client 402. This is the approach taken by some encryption mechanisms, such as TLS version 1.3. In prior versions of TLS, and in other schemes, the key exchange is performed only after an exchange of Hello messages.

In response to receiving ClientHello message 406, server 404 may generate and send a ServerHello message 408 back to client 402. Such a ServerHello message 408 may include the server key information for server 404, extensions, and the server certificate of server 404, which may be encrypted using the client keys sent by client 402 as part of ClientHello message 406. Client 402 can then use its own keys to decrypt ClientHello message 406 and begin encrypting its subsequent messages based on the information included in ServerHello message 408. For example, client 402 may use the server certificate included in ServerHello message 408 to authenticate server 404 and the server keys and extensions included in ServerHello message 408 to control the encryption of a GET HTTP message 410 sent by client 402 to server 404. In turn, server 404 can use the information that it obtained from the handshake, to encrypt an HTTP response message 412 sent to client 402 in response to message 410.

One or more intermediary networking devices (e.g., a switch, router, firewall, etc.) located along the path between client 402 and server 404 may capture data from messages 406-412 of encrypted session 400. For example, ClientHello message 406 may include information such as the version of TLS that client 402 wishes to use, a sessionlD, the ciphersuite(s) offered, the compression method, TLS extensions such as Server Name Indication (SNI), Heartbeat, and the like.

Identifying the underlying process that creates a network connection can be useful from both a security standpoint and a networking standpoint. Notably, identification of the underlying process can be used to detect malware, vulnerable executables, and the like. In addition, knowledge of the process can also be used to prioritize traffic, aid in diagnostics (e.g., analyzing how the process communicates across different network segments, etc.), etc.

The techniques described herein allow for the identification of an executable process associated with an encrypted traffic session without actually decrypting the traffic. In some configurations, the techniques herein can be used to construct an enhanced fingerprint database (e.g., an enhanced TLS fingerprint database) with process and contextual data captured in any number of networks and updated with fused data from the network and/or the endpoint. In turn, a model may be constructed on top of the fingerprint database that identifies the most probable process given a new session or set of sessions. Doing so allows a network operator to solve security and networking issues by providing enhanced visibility into the endpoint processes that create the sessions.

Specifically, according to one or more configurations of the disclosure as described in detail below, a device obtains data regarding an encrypted traffic session in a network. The data includes features (e.g., TLS features) of the traffic session and auxiliary information indicative of a destination address of the traffic session, a destination port of the traffic session, or a server name associated with the traffic session. The device retrieves, using the obtained data, a plurality of candidate processes from a fingerprint database that relates processes with data from encrypted traffic sessions initiated by those processes. The device uses a probabilistic model to assign probabilities to each of the plurality of candidate processes. The device identifies one of the plurality of candidate processes as having initiated the encrypted traffic session based on its assigned probability.

Illustratively, the techniques described herein may be performed by hardware, software, and/or firmware, such as in accordance with the process identifier 216, which may include computer executable instructions executed by the processor(s) 204 (or independent processor of interfaces 202) to perform functions relating to the techniques described herein.

Operationally, the techniques herein leverage the concept of a fingerprint, to identify the underlying process that initiates an encrypted session (e.g., an encrypted TLS session) in a network. In general, a 'fingerprint' is a sequence of bytes formed by parsing (some of) the fields of a network session, selecting some bytes from some of those fields, and then optionally normalizing them. Similarly, a 'signature' is a rule that is based on the fields of packet headers (including destination port) and patterns that can appear in the data stream of the session, or in a particular field. Likewise, a 'watchlist' refers to a set of IP addresses that identifies compromised or malicious Internet servers, or other important categories of devices.

Figure 5:
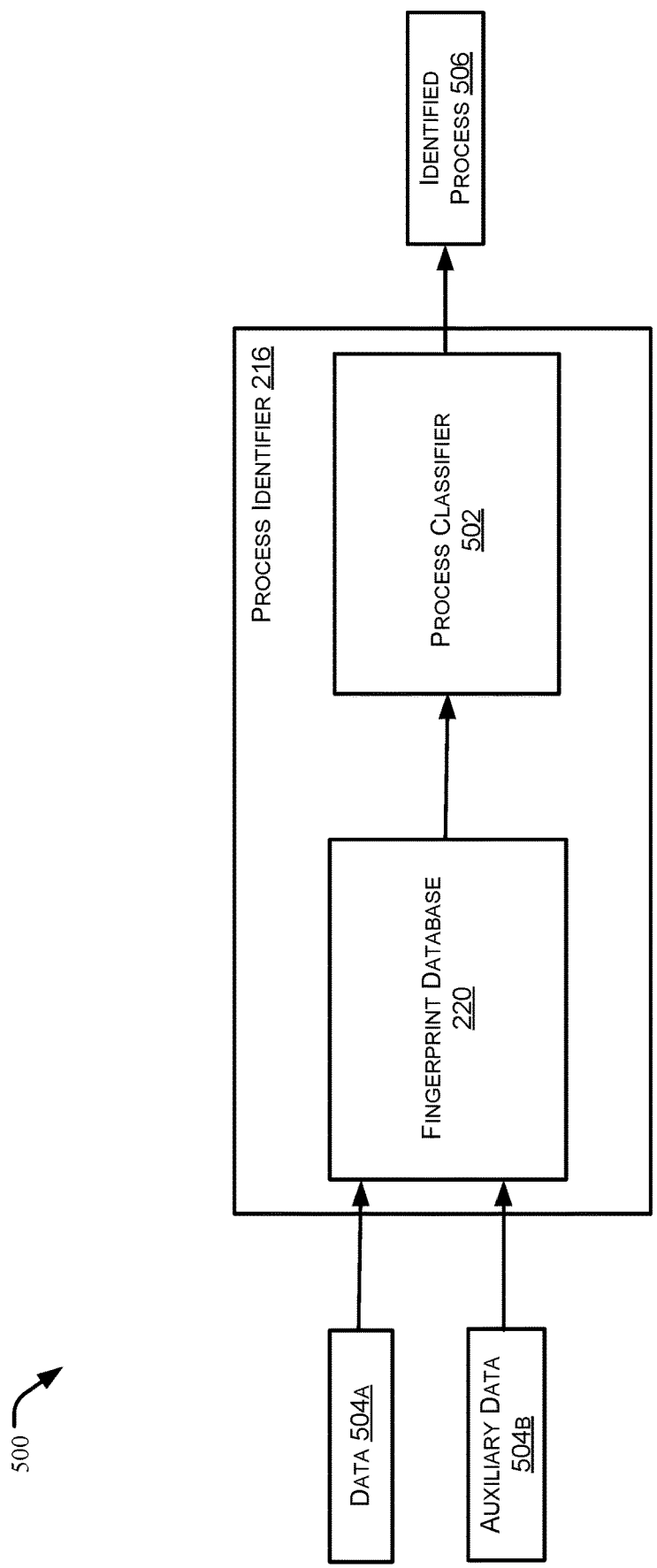
FIG. 5 illustrates an example architecture for identifying a process that initiated an encrypted traffic session in example communication network of FIGS. 1A and 1B.

FIG. 5 illustrates an example architecture 500 for identifying the process that initiated an encrypted traffic session in a network, according to various embodiments. In configurations, architecture 500 includes process identifier 216, fingerprint database 220 and a process classifier 502. The components of architecture 500 may be implemented in a distributed manner or implemented on a single device. In addition, some or all of components 216, 220 and 502 may be implemented as part of a monitored network (e.g., at the network edge, internal to the network, etc.) or part of a cloud-based device classification service. For example, in some implementations, a cloud-based device classification service may receive telemetry data captured from a network and return an indication of the identified process back to the network. The functionalities of the components 220 and 502 of architecture 500 may also be combined, omitted, or implemented as part of other processes, as desired.

As shown, process identifier 216 may receive data 504a and 504b from any number of devices in the network 100 regarding an encrypted traffic session. For example, process identifier 216 may receive data 504a and 504b from any number of switches, routers, firewalls, or other intermediate networking devices located between endpoints of the traffic session. In further cases, process identifier 216 may receive at least a portion of data 504a and 504b directly from an endpoint of the encrypted session.

An example of the schema for data 504a and 504b is as follows:

| TLS FP | src_ip | dst_ip | dst_port | server_name |
|---|---|---|---|---|
| (0303)(1303 . . . | 10.0.0.1 | 173.0.0.1 | 443 | google.com |
| (0303)(1303 . . . | 10.0.0.1 | 184.0.0.1 | 443 | stackoverflow.com |
| (0303)(1303 . . . | 10.0.0.2 | 173.0.0.1 | 443 | google.com |
| (0303)(1303 . . . | 10.0.0.2 | 52.0.0.1 | 443 | reddit.com |
| (0303)(1303 . . . | 10.0.0.3 | 52.0.1.1 | 443 | amp.cisco.com |
| (0303)(1303 . . . | 10.0.0.3 | 52.0.1.1 | 443 | amp.cisco.com |

According to various embodiments, process identifier 216 may construct and maintain the fingerprint database 220 based on the received data 504a and 504b, as previously described. In some configurations, a fingerprint in fingerprint database 220 may take the form of a string, such as an octet string, derived from observations of a single network session by extracting carefully selected substrings from that data stream in such a way that the fingerprint is identical across each session initiated by a particular process.

While fingerprinting alone can help to identify the process associated with an encrypted traffic session, one observation is that two or more processes may have the same fingerprint. As used herein, a ' process family' refers to a set of related processes that all have the same fingerprint. More specifically, a process family includes distinct applications that share some software in common, or that are functionally equivalent. By way of example, Firefox version 68 for Linux, Mac, and Windows may all belong to the same process family. Additionally, there can also be more than one process family associated with a single fingerprint, leading to potential classification issues when relying on data 504a alone.

According to various embodiments, the techniques herein address the above challenges by augmenting the captured fingerprint data in data 504a for an encrypted session with auxiliary/contextual information in auxiliary data 504b regarding the destination and timing information for the session (e.g., time and/or date). For example, data 504b may include any or all of the following information: the destination IP address of the encrypted session; the destination port of the encrypted session; the destination host/server name (e.g., from the SNI extension); and timing information for the session, such as the day and time of the session.

As shown, process identifier 216 may construct the fingerprint database 220 based on the obtained data 504a and 504b as previously described. When implemented as part of a cloud service, fingerprint database 220 may be constructed from potentially billions of observed encrypted sessions across any number of different networks. The database 220 may include a set of contextual data observed for a process or process family (based on the clustering of observations previously described)/fingerprint pair: a list of destination IP addresses (with their frequency count); a list of destination ports (with their frequency count); a list of server names taken from the server_name extension (with their frequency count); overall counts, and counts limited to recent time windows (e.g., last 30 days).

In other words, process identifier 216 may construct database 220 by obtaining data 504a and 504b regarding many network sessions. Then, for each session, process identifier 216 may extract the fingerprint from data 504a and then increment the frequency count of each destination address, destination port, and/or server name indicated by auxiliary data 504b regarding the encrypted session. An overview of an example schema for fingerprint database 220 is as follows:

{"str_repr": "(0303) (1301 . . . ",
  "count": 6,
  "process_info": [
    {"process": 0,
      . . .
    }
    {"process": 1,
      . . .
    }

An example schema of a database entry for database 220 is as follows:
{
  "process": 0,
  "context": {
    "top_domain": "google.com",
    "unique_src": 2,
    "src_oses": "cross-platform", }
"dst_info": [
  "(173.0.0.1) (443) (google.com)": 2,
  "(184.0.0.1)(443) (stackoverflow.com)": 1,
  "(52.0.0.1) (443)(reddit.com)": 1]
}

According to various embodiments, process identifier 248 may also include process classifier 502 configured to output an indication of an identified process 506 for a particular encrypted traffic session. For example, for a given TLS ClientHello message observed in the network, the message may be transformed into a string representation that acts as a unique key that process classifier 502 can use to query fingerprint database 220. This allows process classifier 502 to retrieve the list of probable process(es) associated with the key, along with their auxiliary/contextual information. For each of these processes, process classifier 502 may calculate a normalization factor that describes the prior probability of each process given the fingerprint, i.e., the probability of a process before the target session is considered. As a simple example, the normalization factor may be of the form: process ["count_last_30_days"]/fingerprint ["count_last_30_days"].

The above gives more weight to processes that were observed using a specific fingerprint over the last 30 days. In this context, "last 30 days" indicates the 30-day period prior to when the session was observed. In further embodiments, process classifier 502 may use other models, to predict the probability of a process. For instance, instead of tracking the count of each process for each day, that distribution could be approximated as a Gaussian, a one-sided Gaussian, or another probability distribution.

Next, process classifier 502 may then extract session specific data, to increase the fidelity of the initial estimate. More specifically, process classifier 502 may extract three fields: destination IP address, destination port, and the server_name extension data. For each field, process classifier 502 may assign a probability to each process based on the observed session's data and the contextual data contained within the process's fingerprint entry in database 220 indicating how probable a process is given the observed data. From this, process classifier 502 may compute these values by dividing the occurrences of the process/field pair by the total count of the process.

By way of example, assume that a fingerprint has been associated with both Microsoft Outlook and Firefox. Additionally, for this specific fingerprint, the contextual data indicates that Microsoft Outlook goes to "nexusrules.officeapps.live.com" in 30% of its sessions and Firefox goes to "nexusrules.officeapps.live.com" in less than 1% of its session. The per-process server_name probabilities will thus lead to process classifier 502 preferring Microsoft Outlook, in this case.

Process classifier 502 can then combine the above information, to assign a single value to each process. In turn, process classifier 502 may use these values to select the most likely process from the list of processes given by the fingerprint and output the result as identified process 505068. To do so, process classifier 502 may, for each session-specific field, multiply the field by a field-specific weight, and then create a linear combination of the different fields for each process. A domain expert can assign the field-specific weights, or an optimization procedure can assign the weights based on the available data, in various embodiments. Finally, process classifier 502 may multiply the linear combination by the normalization factor and report the process with the maximum value as identified process 506. Additional data features that can also be used by process classifier 502 for this such as, for example, a Boolean value that indicates whether the destination port is different than 443 (the standard TLS port for example). The computation by process classifier 502 to identify the most probable process can either be done online or can be pre-computed given the input data features.

In further embodiments, rather than simply assess encrypted flows as they occur (e.g., based on their observed ClientHello messages), process classifier 502 may also take into account state information about previously seen connections, as well. Note that the contextual/auxiliary data for a process/fingerprint pair, such as destination IP address, port, and server name, is often very informative. However, this is not always the case. For example, Chrome and Firefox will visit similar sites because a user is driving the majority of the generated traffic. But, both of these processes have a non-negligible set of control traffic, or indicators, that visits servers that are very informative for process identification (e.g., *. mozilla. org).

Accordingly, process identifier 216 may also incorporate multiple sessions into its analysis, to build up an inventory of applications for a specific endpoint, and let that inventory inform future process identifications. For example, if process identifier 216 has seen many browser-related sessions from an endpoint, the smaller set of indicator flows can help to adjust the process-specific scores, so that they are more aligned with past observations. In one embodiment, process classifier 502 can also incorporate the sequential nature of network traffic by modeling the network traffic from an endpoint as a Markov process. If, for example, process identifier 216 observes an initial connection from Firefox to *.mozilla.org, and then observes a connection to *.google.com from the same endpoint, process classifier 504 can incorporate the probability of seeing two consecutive Firefox flows into is process identification decision, as opposed to a Firefox flow and then a googleupdate.exe flow.

Figure 6:
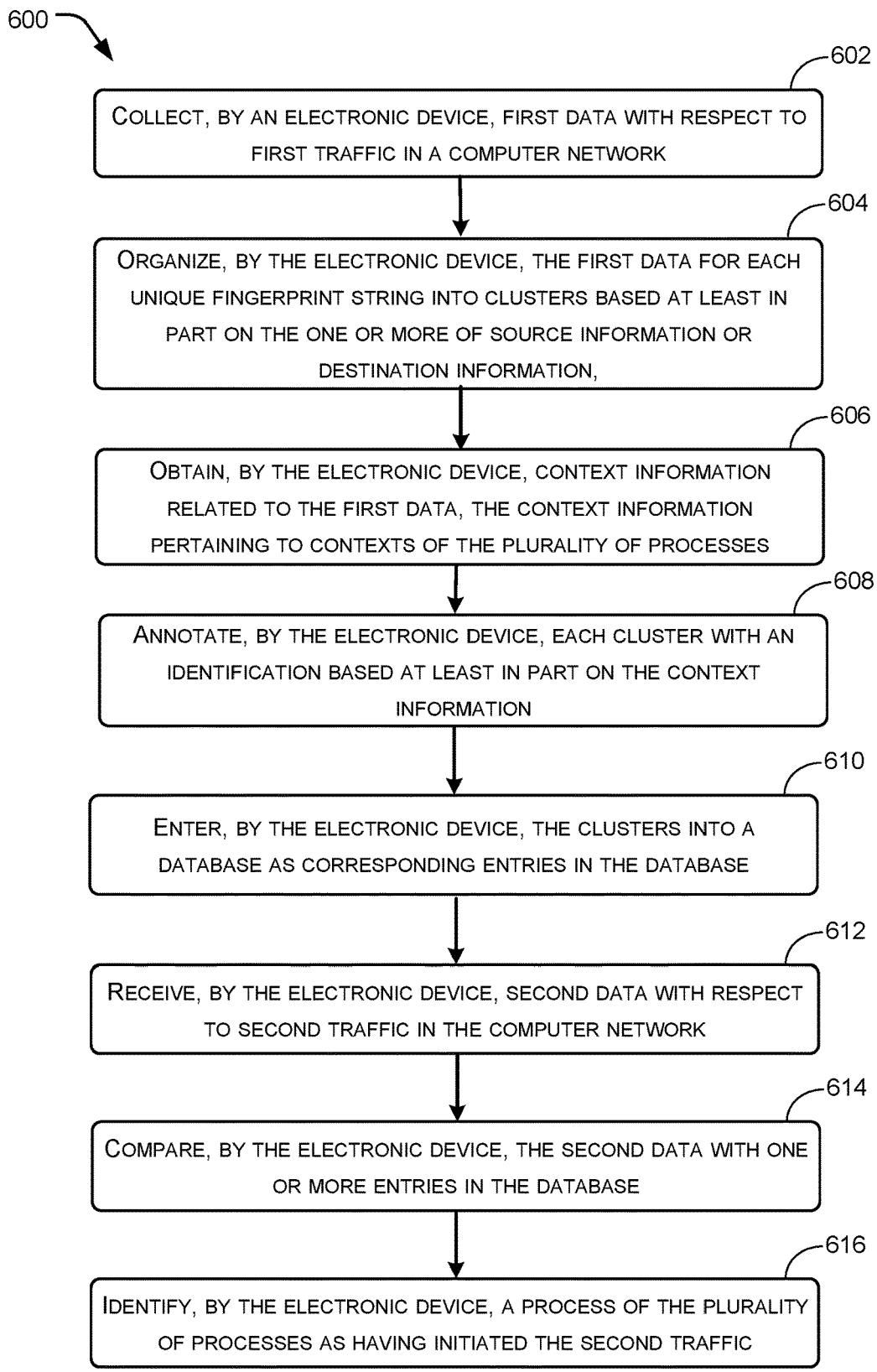
FIG. 6 illustrates a flow diagram of an example method for identifying a process that initiated an encrypted traffic session using passively collected network data to automatically generate a fingerprint prevalence database without the need for endpoint ground truth.

FIG. 6 illustrates a flow diagram of an example method 600 that illustrates aspects of the functions described herein. The logical operations described herein with respect to FIG. 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, Application-Specific Integrated Circuit (ASIC), and any combination thereof. It should also be appreciated that more or fewer operations might be performed than shown in FIG. 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 6 illustrates a flow diagram of an example method 600 for identifying a process that initiated an encrypted traffic session using passively collected network data to automatically generate a fingerprint prevalence database without the need for endpoint ground truth. At 602, an electronic device, e.g., node/device 200, collects first data with respect to first traffic in a computer network, e.g., network 100. The first data is related to network connections and comprises (i) fingerprint strings and (ii) one or more of source information or destination information related to the fingerprint strings. At 604, the electronic device organizes the first data for each unique fingerprint string into clusters based at least in part on the one or more of source information or destination information. Each cluster represents a process of a plurality of processes related to the first traffic. At 606, the electronic device obtains context information related to the first data. The context information pertains to contexts of the plurality of processes.

At 608, the electronic device annotates each cluster with an identification based at least in part on the context information. Each identification relates to identifications of the processes of the plurality of processes. At 610, the electronic device enters the clusters into a database, e.g., database 220 as corresponding entries in the database. At 612, the electronic device receives second data with respect to second traffic in the computer network. At 614, the electronic device compares the second data with one or more entries in the database. At 616, the electronic device identifies a process of the plurality of processes as having initiated the second traffic.

While the techniques and configurations described herein have been described with emphasis on the transport layer security (TLS) protocol, the techniques and configurations described herein may also be applicable to other protocols such as, for example, QUIC, secure shell (SSH), hypertext transfer protocol (http), etc.

Figure 7:
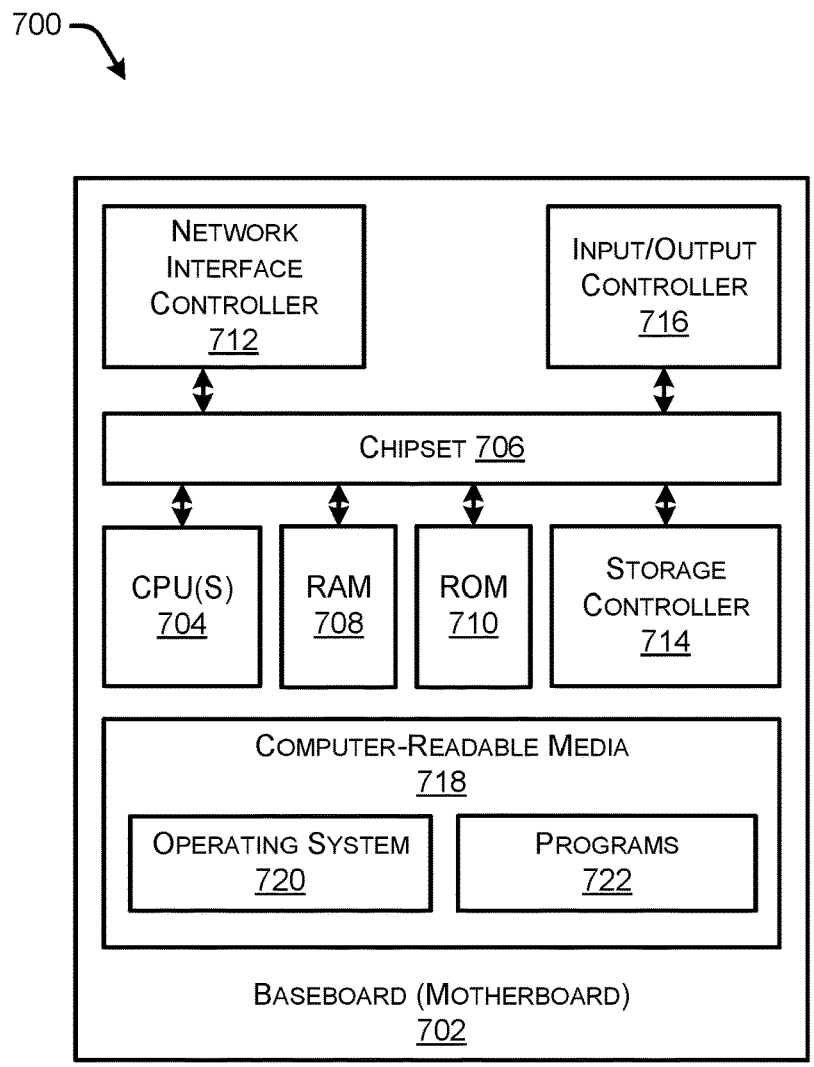
FIG. 7 is a computer architecture diagram showing an illustrative computer hardware architecture for implementing one or more elements of the communication network that can be utilized to implement aspects of the various technologies presented herein.

FIG. 7 shows a further example computer architecture for a computer 700, e.g., node/device 200, capable of executing program components for implementing the functionality described above. One or more computers 700 shown in FIG. 7 may be used to implement one or more elements of the example network 100 described herein, e.g., the PE routers 120, CE routers 110, nodes/device 136-146, servers 152 and 154, and may comprise a conventional server computer, workstation, desktop computer, laptop, tablet, network appliance, e-reader, smartphone, or other computing device, and can be utilized to execute any of the software components presented herein. In some examples, however, the computer 400 may correspond to networked devices such as servers, switches, routers, hubs, bridges, gateways, modems, repeaters, access points, etc., and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network. The chipset 706 can include functionality for providing network connectivity through a NIC 712, such as a gigabit Ethernet adapter. The NIC 712 is capable of connecting the computer 700 to other computing devices over the network. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

The programs 722 may comprise any type of programs or processes to perform the techniques described in this disclosure for managing workloads in compute clusters comprising compute nodes by managing the workloads at the resource level of the compute clusters. Generally, the programs 722 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
collecting, by an electronic device, first data with respect to first encrypted traffic in a computer network, wherein the first data is related to network connections and comprises (i) fingerprint strings and (ii) one or more of source information or destination information related to the fingerprint strings;
organizing, by the electronic device, the first data for each unique fingerprint string into clusters based at least in part on the one or more of source information or destination information, wherein each cluster represents a process of a plurality of processes related to the first encrypted traffic;
obtaining, by the electronic device, context information related to the first data, wherein the context information pertains to contexts of the plurality of processes;
annotating, by the electronic device, each cluster with an identification based at least in part on the context information, wherein each identification relates to identifications of the processes of the plurality of processes;
entering, by the electronic device, the clusters into a database as corresponding entries in the database;
receiving, by the electronic device, second data with respect to second encrypted traffic in the computer network;
comparing, by the electronic device, the second data with one or more entries in the database; and
identifying, by the electronic device, a process of the plurality of processes as having initiated the second encrypted traffic.

2. The method of claim 1, wherein the first data further comprises one or more of a timestamp, a source Internet Protocol (IP) address, a destination IP address, a source port number, a destination port number, or an IP protocol number.

3. The method of claim 1, wherein the context information comprises one or more of a source Internet Protocol (IP) address, a client operating system, a client/server certificate, common domain names, or diversity metrics.

4. The method of claim 1, wherein organizing the first data for each unique fingerprint string into clusters based at least in part on the one or more of source information or destination information comprises organizing the first data for each unique fingerprint string into clusters using a distance-based clustering algorithm.

5. The method of claim 4, wherein the distance-based clustering algorithm comprises a density-based spatial clustering of applications with noise (DBSCAN) algorithm.

6. The method of claim 1, wherein:
sources of the first data comprise one or more of Internet of Things (IoT) devices, mobile devices, containers, or servers; and
sources of the second data comprise one or more of Internet of Things (IoT) devices, mobile devices, containers, or servers.

7. The method of claim 1, further comprising modifying a particular identification of a corresponding entry in the database based at least in part on ground truth of a corresponding process associated with the corresponding entry in the database.

8. The method of claim 1, wherein annotating each cluster with an identification comprises using a rules-based engine that uses the context information to generate each identification.

9. An apparatus comprising:
one or more processors; and
one or more non-transitory computer-readable media storing computer-executable instructions that, when executed by the one or more processors, cause the one or more processors to perform actions comprising:
collecting first data with respect to first encrypted traffic in a computer network, wherein the first data is related to network connections and comprises (i) fingerprint strings and (ii) one or more of source information or destination information related to the fingerprint strings;
organizing the first data for each unique fingerprint string into clusters based at least in part on the one or more of source information or destination information, wherein each cluster represents a process of a plurality of processes related to the first encrypted traffic;
obtaining context information related to the first data, the context information pertaining to contexts of the plurality of processes;
annotating each cluster with an identification based at least in part on the context information, each identification relating to identifications of the processes of the plurality of processes;
entering the clusters into a database as corresponding entries in the database;
receiving second data with respect to second encrypted traffic in the computer network;
comparing the second data with one or more entries in the database; and
identifying a process of the plurality of processes as having initiated the second encrypted traffic.

10. The apparatus of claim 9, wherein the first data further comprises one or more of a timestamp, a source Internet Protocol (IP) address, a destination IP address, a source port number, a destination port number, or an IP protocol number.

11. The apparatus of claim 9, wherein the context information comprises one or more of a source Internet Protocol (IP) address, a client operating system, a client/server certificate, common domain names, or diversity metrics.

12. The apparatus of claim 9, wherein organizing the first data for each unique fingerprint string into clusters based at least in part on the one or more of source information or destination information comprises organizing the first data for each unique fingerprint string into clusters using a distance-based clustering algorithm.

13. The apparatus of claim 12, wherein the distance-based clustering algorithm comprises a density-based spatial clustering of applications with noise (DBSCAN) algorithm.

14. The apparatus of claim 9, wherein:
sources of the first data comprise one or more of Internet of Things (IoT) devices, mobile devices, containers, or servers; and
sources of the second data comprise one or more of Internet of Things (IoT) devices, mobile devices, containers, or servers.

15. The apparatus of claim 9, further comprising modifying a particular identification of a corresponding entry in the database based at least in part on ground truth of a corresponding process associated with the corresponding entry in the database.

16. The apparatus of claim 9, wherein annotating each cluster with an identification comprises using a rules-based engine that uses the context information to generate each identification.

17. One or more non-transitory computer-readable media storing computer-executable instructions that, when executed by one or more processors, cause the one or more processors to perform actions comprising:
collecting first data with respect to first encrypted traffic in a computer network, wherein the first data is related to network connections and comprises (i) fingerprint strings and (ii) one or more of source information or destination information related to the fingerprint strings;
organizing the first data for each unique fingerprint string into clusters based at least in part on the one or more of source information or destination information, wherein each cluster represents a process of a plurality of processes related to the first encrypted traffic;
obtaining context information related to the first data, the context information pertaining to contexts of the plurality of processes;
annotating each cluster with an identification based at least in part on the context information, each identification relating to identifications of the processes of the plurality of processes;
entering the clusters into a database as corresponding entries in the database;
receiving second data with respect to second encrypted traffic in the computer network;
comparing the second data with one or more entries in the database; and
identifying a process of the plurality of processes as having initiated the second encrypted traffic.

18. The one or more non-transitory computer-readable media of claim 17, wherein the first data further comprises one or more of a timestamp, a source Internet Protocol (IP) address, a destination IP address, a source port number, a destination port number, or an IP protocol number.

19. The one or more non-transitory computer-readable media of claim 17, wherein the context information comprises one or more of a source Internet Protocol (IP) address, a client operating system, a client/server certificate, common domain names, or diversity metrics.

20. The one or more non-transitory computer-readable media of claim 17, wherein organizing the first data for each unique fingerprint string into clusters based at least in part on the one or more of source information or destination information comprises organizing the first data for each unique fingerprint string into clusters using a distance-based clustering algorithm.

* * * * *